United States Patent Office 3,563,763
Patented Feb. 16, 1971

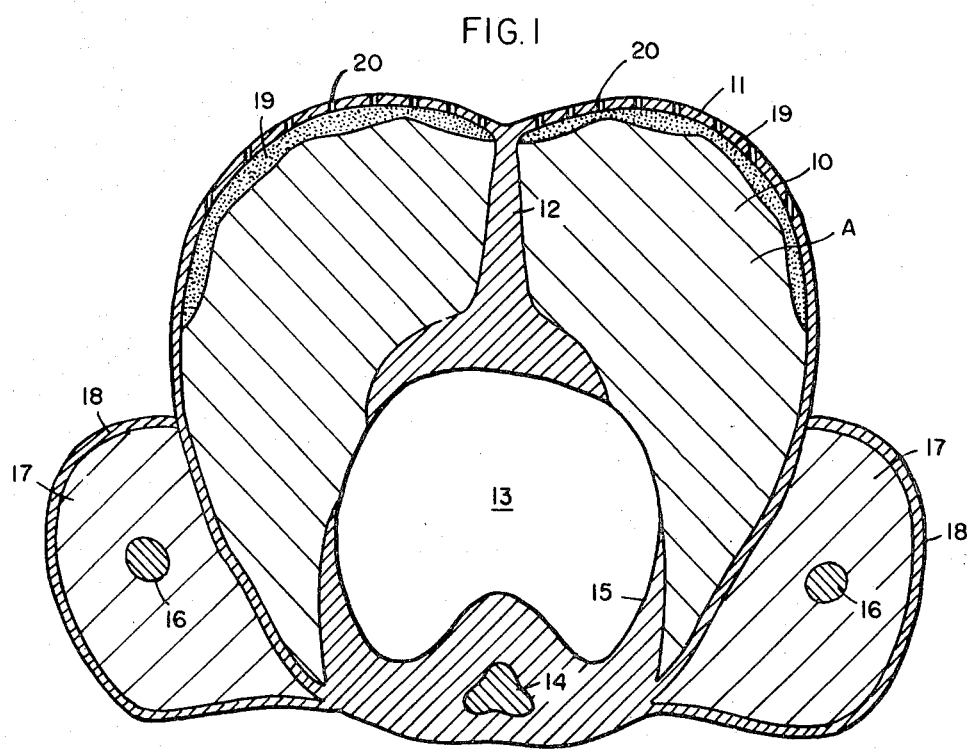
FIG. I
INVENTORS:
DONALD V. SCHWALL
ALAN B. ROGERS
DENNIS CORBIN

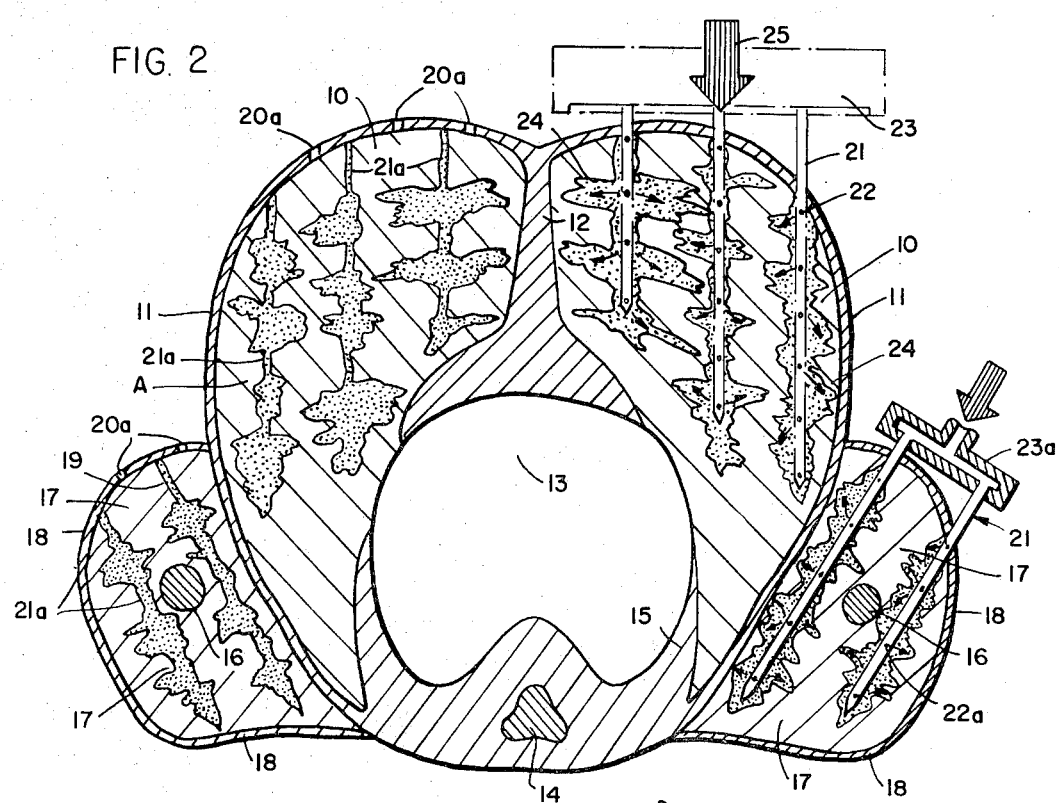
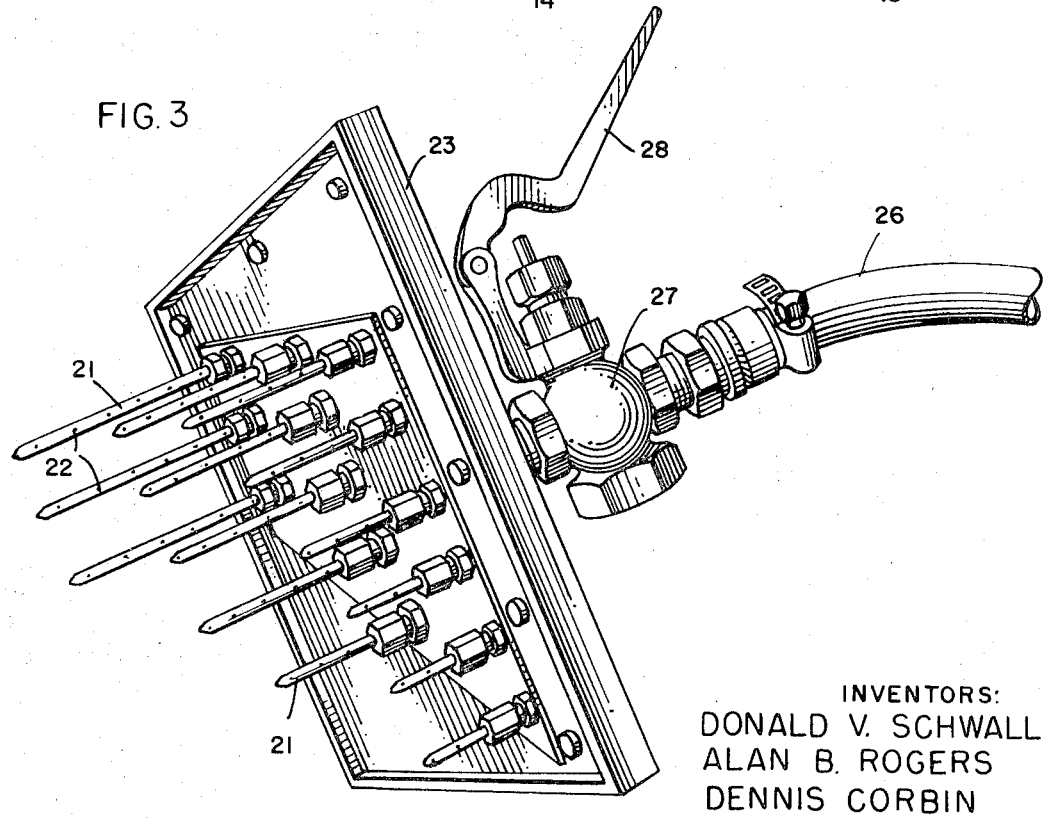

3,563,763
SELF-BASTING POULTRY PRODUCTS
Donald V. Schwall, Glen Ellyn, Alan B. Rogers, Palos Park, and Dennis Corbin, Lombard, Ill., assignors to Armour and Company, Chicago, Ill., a corporation of Delaware
Continuation-in-part of application Ser. No. 573,305, Aug. 18, 1966, which is a continuation-in-part of application Ser. No. 492,319, Oct. 1, 1965. This application Nov. 22, 1967, Ser. No. 685,074
The portion of the term of the patent subsequent to Jan. 30, 1985, has been disclaimed
Int. Cl. A22c 21/00; A23b 1/00
U.S. Cl. 99—107     9 Claims

ABSTRACT OF THE DISCLOSURE

A self-basting dressed poultry carcass, which during cooking bastes the skin over the breast muscle portion of the carcass, contains within the breast enlarged reservoirs of added edible fat and flow passages lead from the reservoirs to the inner and outer surfaces of the breast skin whereby during the cooking process basting fat is supplied to the skin.

RELATED CASES

This application is a continuation-in-part of our co-pending application Ser. No. 573,305 filed Aug. 18, 1966 now Pat. No. 3,366,491 issued Jan. 30, 1968, which in turn is a continuation-in-part of our application Ser. No. 492,319 filed Oct. 1, 1965 now abandoned.

BACKGROUND AND SUMMARY

The blasting of turkeys, chickens, and other species of poultry has been practiced by the housewife for many years as a means for retaining the moisture in the meat so as to render it juicy and more palatable while also protecting the skin to give it an edible texture, and further to give the skin the desired golden brown color. Unfortunately, such basting, which is accomplished by applying the juices of the meat from the pan repeatedly to the skin of the poultry, usually requires an interruption of the cooking, drawing of the pan out of the oven, etc., and in the operation there is danger of burning the hands, splashing liquids outside of the pan, etc. If it were possible to produce such basting without interrupting the cooking and without manipulating heated liquids from the pan while still obtaining the benefits of the basting operation, a substantial advance in this field would be made.

We have discovered that by introducing an edible fat into the carcass below the skin that such basting material can be caused to feed outwardly through apertures in the skin to provide a continuous and automatic application of the edible fat onto the skin during the cooking operation. Thus, without removing the poultry carcass from the oven, there is an automatic distribution of the basting fat over the skin of the bird. At the same time, the basting fat is applied to the inner side of the skin, thus providing a double basting action during the cooking operation. Further, after the basting fat, etc. is injected into the carcass, the skin is effective in retaining the fat and the exterior of the skin may be washed so that a clean, clear surface free of fat is presented to the plastic wrapper in which the bird is packaged.

A primary object, therefore, is to provide a raw, dressed poultry carcass containing an added edible fat which is fed automatically and distributed over the bird during the cooking operation. A further object is to provide a method for treating raw, dressed poultry carcasses by incorporating an edible fat therein which will be fed automatically over the surface of the bird as the same is being cooked. A further object is to provide a self-basting poultry carcass in which edible fat is added to the carcass under the skin thereof and also in the muscle portion thereof. Yet another object is to provide a process and product wherein a basting fat is added to a raw poultry carcass below the skin thereof and in which passages through the skin are utilized for distributing the basting fat over the carcass during the cooking operation. Other specific objects and advantages will appear as the specification proceeds.

DRAWINGS

The invention is shown, in illustrative embodiments, by the accompanying drawings, in which—

FIG. 1 is a cross section of a turkey in which edible fat is introduced under the skin of the turkey in accordance with our invention; FIG. 2, a cross section of a turkey in which the edible fat is introduced not only under the skin but deeply into the breast muscle of the turkey to insert edible fat therein; and FIG. 3, a perspective view of a needle injection mechanism which may be employed in the practice of our invention.

DETAILED DESCRIPTION

In the illustration given in FIG. 1, A designates the raw carcass of a dressed turkey in which the breast muscle or portion is indicated by the numeral 10. Extending over the breast portion 10 is the skin 11. The breast portions 10 are separated by the keel bone 12 which extends above the body cavity 13. Below the body cavity are the backbone 14 and ribs 15. The leg bones are indicated by the numeral 16, and the muscle meat thereof by the numeral 17. Skin 18 encloses the leg portion 17.

As shown in FIG. 1, we inject a body of edible fat 19 by the use of any suitable means, such as, for example, a syringe, the needle of the syringe being inserted through the skin 11 and the needle moved under the skin to distribute the fat in a line across the breast, as illustrated, or in any desired formation over the breast muscle 10. If desired, it is possible to insert the fat from the body cavity 13 through the muscle portion 10 until the fat lies adjacent the skin 11. The skin 11 may be provided with a series of perforations or apertures 20 through which the edible fat may flow for even distribution of the fat over the skin during the cooking operation. The openings or passages 20 may be formed at the time the fat is injected or, if desired, the housewife may be instructed to make the perforations with a fork prior to placing the bird in the oven.

We prefer to introduce the edible fat deeply within the breast muscle 10, as shown in FIG. 2. In this operation, needles 21 provided with spaced side openings 22 and communicating with a manifold 23 are inserted into the breast muscle of the turkey, and the edible fat 24 is distributed by the needles 21 within the breast as indicated on the right-hand side of FIG. 2 by the arrow 25. In this manner, depots of fat are formed within the breast of the turkey, and simultaneously flow passages 21a are formed by the needles 21 so that the fat may subsequently flow through the passages 21a and skin openings 20a to the exterior of the skin 11 for even distribution of the fat over the skin during the cooking operation. By having the fat in stepped strata within the breast 10, it is found that as the bird is cooked, first the uppermost fat bodies are melted and brought to the surface of the skin, and then as the cooking proceeds the deeper depots of fat are brought by the needle passages upwardly to the surface by the breast juices so as to distribute the fat over the skin 11. Thus there is a reservoir of fat which is utilized progressively to provide a continuous automatic distribution of the same as basting fat over the skin. At the same time, it is found that as the skin is cooked, it tends to separate more completely from the breast muscle 10 and the basting fat engages the inner side of the skin, thus bringing about a double basting effect.

Any suitable mechanism for injecting the fat into the poultry may be employed. In the illustration given in FIG. 3, we provide a manifold box 23 equipped with needles 21 having side openings 22, the needles being of different lengths so as to enable the operator to inject the basting fat into the breast of the poultry carcass in a single operation. Edible fat, including edible oil, is fed from a reservoir through the flexible conduit 26, and the flow to the manifold container 23 is controlled by valve 27 actuated by the handle 28. The same mechanism may be conveniently utilized for injecting fat into the leg muscle 17 of the turkey or other species of poultry.

In the operation of the injection mechanism shown in FIG. 3, it is surprising to find that the skin 11 of the poultry carcass moves freely as it is engaged by the needles 21, and normally when the instrument is pulled away to withdraw the needles it is found that the opening 20a through the skin is not aligned with the needle passage 21a through the muscle 10, as shown on the left side of FIG. 2. This misalignment, which occurs because of the tendency of the skin to move instantly when engaged, is an advantage in that the skin then seals off the needle passages through the breast muscle 10 so that immediately after injection there is practically no tendency for the edible fat to flow out and onto the skin. The skin of the dressed poultry carcass stretches and moves relative to the fixed body muscle 10 as much as one inch during the handling of the bird, and such flexing of the skin independently of the breast muscle 10 further facilitates the introduction of edible fat below the skin, as illustrated in FIG. 1.

Any suitable edible fat may be employed. We prefer to use an edible fat such as the common edible animal fats and oils or emulsions or mixtures thereof. By "edible fats," we include fats and oils such as, for example, butter, butter oil, corn oil, lard, margarine, cottonseed oil, and other well-known vegetable and animal fats and oils. We prefer to employ food fats and other glycerides having the characteristics of such fats. The edible fat need be heated only to a temperature at which it is fluid or plastic so that it may be injected by the applicator or needles through the skin and into the meat body.

The size of the needles may vary depending upon the type of edible fat being injected. For example, we may employ needles ranging from about .018 inch in diameter to about ¼ inch in diameter. The needles should be large enough to form a passage through which the edible fat can be moved under the pressure of body juices during cooking so that the fat is distributed over the exterior of the skin. When butter is used as the edible fat, better results have been obtained with needles having a diameter of about .021 inch (21 gauge) or higher. Since the body juices contain protein and coagulation of the protein occurs, the passages within the range described minimize any blocking thereof by such coagulation and, in addition, the edible fat itself lubricates the passages and aids the outward flow of the basting fat.

The amount of edible fat may vary widely as, for example, in a range of about 0.2 percent to 20 weight percent, based on the weight of the carcass. In the use of butter, as above mentioned, we prefer to use from about 1 to about 10 weight percent.

The edible fat may be used alone or in combination with salts, such as sodium tripolyphosphate. In our copending application Ser. No. 492,319, sodium tripolyphosphate is suspended in the fat, but after the same is injected into the poultry, the tripolyphosphate migrates from the fat and into the poultry meat, the fat thus remaining to provide self-basting for the poultry throughout the cooking stage. In order to keep the sodium tripolyphosphate in suspension within the edible fat while the mixture is being injected into the poultry, the mixture is rapidly agitated, and preferably we reduce the size of the phosphate particles, as by the use of a colloid mill, so that these particles can be maintained in suspension by moderate agitation during the injection operation. The sodium tripolyphosphate is utilized in retaining natural juices in the muscle portions of the poultry while the edible fat is utilized in spaced depots for continuously supplying the basting fat to the outer surface of the skin.

After injecting the edible fat through needles, as above described, into the poultry carcasses, the carcasses may be chilled or frozen, and in this operation it is found that fats, such as butter or the like, congeal within the needle passages and maintain said passages intact so that later when the carcass is being cooked, the passages serve effectively as flow passages for the movement of the melted edible fat as it is propelled by juices, etc. toward the skin openings.

The cross section of the flow passages is substantially less than the cross section of the reservoirs some of which are at different depth levels.

The dressed poultry carcasses which may be treated as above described include turkeys, chickens, including hens, capons, geese, ducks, pheasants, and the like.

Specific examples illustrative of the invention may be set out as follows:

EXAMPLE I

Eight-pound turkeys which had been frozen and thawed to an average carcass temperature of 50° F. were injected with 40 cc. of the following materials per side of turkey breast:

(a) Butter containing 10% powdered tripolyphosphate
(b) Water solution of 10% tripolyphosphate
(c) Butter alone
(d) Control—no injection.

When the turkeys were roasted, they were evaluated for flavor, tenderness, and juiciness. The turkey injected with butter and phosphate was rated best of all the samples tested. The turkey injected with butter alone was evaluated as next in value for flavor, tenderness, and juiciness.

EXAMPLE II

A thawed 12-pound, 13-ounce turkey was injected with 12 ounces of butter into one-half of the breast using an 18-gauge needle. The turkey was then roasted uncovered in a 320° F. oven. During roasting, the injected butter gradually basted the surface of the turkey and imparted a golden brown, moist, basted appearance, whereas the non-injected (control) half of the breast had a dry surface.

EXAMPLE III

Approximately 20 holes were pierced into one side of a 17-pound turkey with a 27-gauge needle, and on the other side 5½ ounces of melted butter were injected into the breast with a 21-gauge needle. The butter-injected side of the turkey basted itself satisfactorily from approximately two-thirds of the holes during roasting in a 320° F. gas range oven, the results being similar to those described in Example I.

EXAMPLE IV

A 17-pound turkey was injected with 60 cc. of vegetable oil by the use of an 18-gauge needle along a line of holes on the top right side of the breast near the keel bone. Forty cc. of vegetable oil were injected with a ⅛ inch diameter needle along the lower side of the right side of the breast. The left side of the breast had holes punctured through the skin with ⅛ inch needles without applying any oil. During roasting, some basting due to the flow of natural juices was noted from the left side of the turkey where no oil had been injected, but most of the skin surface had a dry appearance.

Basting tended to discontinue after awhile from the small holes in the vegetable oil-injected side approximately halfway through the roasting period. The larger (⅛-inch) oil-injected holes basted continuously during roasting. The right side of the turkey breast had a golden brown, moist, basted appearance, whereas the left side had a dry surface. The skin of the turkey through which the needles were passed in making the injection of the oil into the breast tended to shift into a position covering the opening in the breast muscle after the removal of the needles so that the injection area could be effectively washed to present a clean, attractive carcass surface for encasing in plastic wrappers.

EXAMPLE V

A group of fresh chilled, ready-to-cook turkeys, averaging 12 pounds, were injected with a butter mixture in the breast by an applicator illustrated in FIG. 3 and in the legs by a similar device containing fewer needles. The turkeys were roasted by several common roasting methods and the turkeys exhibited the distinctive appearance described in Example II.

In injecting edible fat into the leg muscles, we prefer to use a manifold and needle injector similar to that shown in FIG. 3 but having fewer needles, such a manifold being shown on the righthand side of FIG. 2, the manifold being indicated by 23a and the needles by 22a.

While in the foregoing specification we have set forth structure and procedure in considerable detail for the purpose of illustrating embodiments of the invention, it will be understood that such details may be varied widely by those skilled in the art without departing from the spirit of our invention.

What is claimed is:
1. A self-basting poultry product which during cooking bastes the skin over a poultry carcass meat portion, comprising a skin-covered raw dressed poultry carcass meat portion having enlarged reservoirs of added edible fat in said meat portion, and flow passages leading from reservoirs in said meat to said skin to permit fat flow for basting said skin, the cross section of said flow passages being substantially less than the cross section of said reservoirs of fat and said fat being present in an amount whereby subsequently during cooking said edible fat flows from reservoirs in said meat through passages to baste said skin over said poultry meat portion.

2. The product of claim 1 in which said meat portion is the poultry breast.
3. The product of claim 1 in which the carcass portion is frozen.
4. The product of claim 2 in which flow passages extend through the breast skin for basting the outer surface of said skin.
5. The product of claim 2 in which passages through said skin are misaligned with passages in said breast and imperforate skin portions overlie passages in said breast.
6. The product of claim 1 in which the fat is butter.
7. The product of claim 1 in which the fat is margarine.
8. The product of claim 1 in which the fat is corn oil.
9. A self-basting poultry product which during cooking bastes the skin over a poultry carcass meat portion, comprising a skin-covered raw dressed poultry carcass meat portion having enlarged reservoirs of added edible fat at different depth levels in said meat portion, and flow passages leading from reservoirs in said meat to said skin to permit fat flow for basting said skin, the cross section of said flow passages being substantially less than the cross section of said reservoirs of fat and said fat being present in an amount whereby subsequently during cooking said edible fat flows from reservoirs in said meat through passages to baste said skin over said poultry meat portion.

References Cited

UNITED STATES PATENTS 2,418,914   4/1947   Tichy _____ 99—107

OTHER REFERENCES

Lord, "Everybody's Cookbook," 1924, published by Harcourt, Brace and Company, New York, pages 620, 621, and 632, copy in Group 172, U.S. Pat. Off.

Montagne, "Larousse Gastronomique," 1961, published by Crown Publishers, Inc., New York, page 581, article entitled Lardoons. Copy in Group 172, U.S. Pat. Off.

HYMAN LORD, Primary Examiner

U.S. Cl. X.R.
99—194